May 26, 1925.
G. A. DE VLIEG
CUTTING TOOL
Filed March 13, 1922
1,538,929
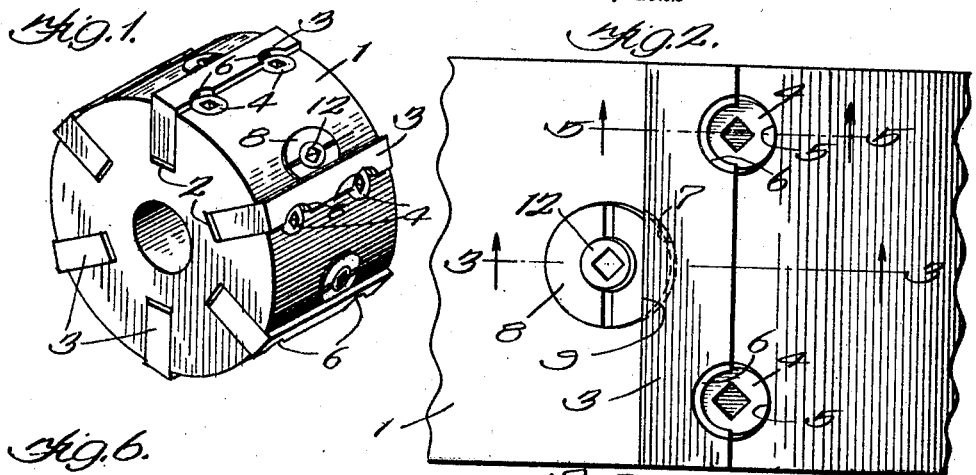
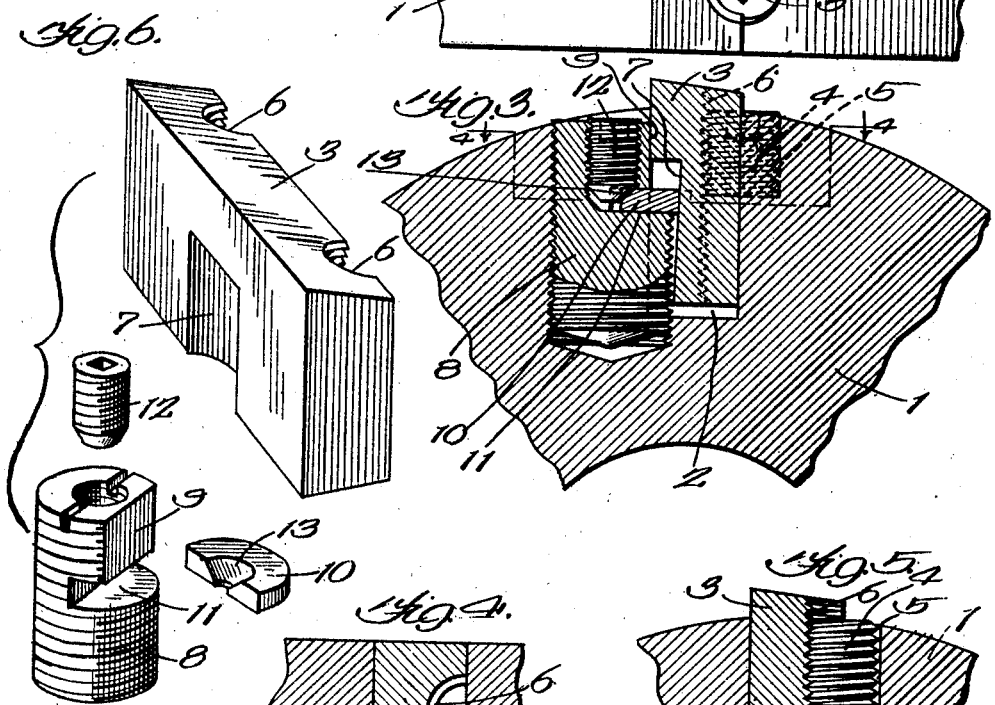
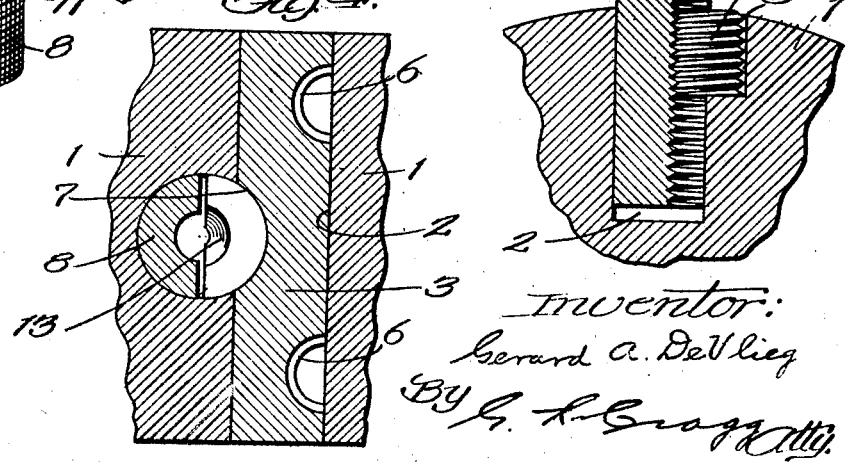
Inventor:
Gerard A. DeVlieg Patented May 26, 1925.

1,538,929

UNITED STATES PATENT OFFICE.

GERARD A. DE VLIEG, OF JANESVILLE, WISCONSIN.

CUTTING TOOL.

Application filed March 13, 1922. Serial No. 543,444.

*To all whom it may concern:*

Be it known that I, GERARD A. DE VLIEG, citizen of the United States, residing at Janesville, in the county of Rock and State of Wisconsin, have invented a certain new and useful Improvement in Cutting Tools, of which the following is a full, clear, concise, and exact description.

My invention relates to tool structures and resides in providing improved mechanism for effecting union between tools and their holders whereby a number of objects and advantages are gained. In carrying out one feature of my invention the tool holder is formed with a recess and a block is carried by the tool holder in a manner to be movable laterally of and against a side of the tool to fix it in assembly with the holder. The means for forcibly moving the block into holding engagement with the tool is desirably in the form of an adjusting screw in wedging engagement with the block.

In accordance with another characteristic of the invention a carrier is provided for the block adjusting means, this carrier being in threaded engagement with the holder whereby the block and its adjusting screw may be simultaneously adjusted with reference to the tool and its holder, whereafter the block may be adjusted with reference to the carrier to perform its function. A tool thus assembled with its holder is preferably micrometrically adjusted in its holder by means of adjusting screws in threaded engagement with the tool. In adjusting the tool within its holder the block is initially loose whereupon the tool adjusting screws are manipulated to bring the tool into the desired relation with its holder whereafter the clamping block is applied to hold the tool in the adjustment that has been selected for it.

I will explain my invention more fully by reference to the accompanying drawing showing the preferred embodiment thereof and in which Fig. 1 is a perspective view illustrating a milling tool or reamer embracing all the characteristics of the invention; Fig. 2 is a plan view, on a larger scale, of a part of the structure as it appears in Fig. 1; Fig. 3 is a sectional view on line 3—3 of Fig. 2; Fig. 4 is a sectional view on line 4—4 of Fig. 3; Fig. 5 is a sectional view on line 5—5 of Fig. 2; and Fig. 6 is a view in perspective showing parts of the structure in separated relation.

Like parts are indicated by similar characters of reference throughout the different figures.

The tool holder illustrated is in the form of a cylindrical body 1 provided with a number of tool receiving recesses 2 each containing, in the embodiment of the invention illustrated, a tool blade 3 whereby the entire structure may be constituted a reamer or milling tool. The invention, however, is not to be limited to any particular form of tool holder nor to any particular form of tool held thereby, nor to the number of tools upon the tool holder.

Where tool blades 3 are to be held in assembly with their mounting or holder, there are preferably two adjusting screws 4 for each blade which are partially disposed in pockets 5 in the tool holder 1 and extend from these pockets into the semi-cylindrical recesses 6 adjacent the ends of said corresponding blade and upon the same side of the blade. Another recess 7 is upon the opposite side of each blade between the recesses 6. A carrier 8 is provided for each blade, each carrier being disposed in an enlargement of the corresponding tool receiving recess. Each carrier 8 has threaded engagement with the holder 1 so that it may be moved toward and from the axis of the holder. The carriers are formed with flat faces 9 that are in engagement with the opposed flat faces of the tool blades whereby the carriers take part in holding the tool blades in position and the tool blades prevent the carriers from being rotated from the positions to which they have been adjusted. Each carrier 8 supports a block 10 receivable within a transverse opening 11 in the corresponding carrier and movable in such opening laterally of and against one side of the corresponding tool blade. An adjusting screw 12 is inserted within the upper end of each carrier 8 and has a lower conical end in wedging engagement with the conical surface 13 in the corresponding block 10.

In adjusting the tools the blocks 10 are initially loose whereupon the screws 4 may be turned to secure the desired adjustment of the tools. After this adjustment, which is micrometric, has been effected the screws 12 are turned to force the blocks 10 laterally of and against the adjacent sides of the tools. The upright face portions of these tools that are engaged by the blocks 10 are preferably slightly inclined so that the parts of the tools engaged by the blocks will taper outwardly to supplement the clamping action of the blocks in holding the tools in place.

As hitherto stated, the invention is not to be limited to any particular form of tool holder nor to the mounting thereon of any particular kind or number of tools.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a tool structure, the combination with a tool holder formed with a tool receiving recess; of a tool inserted within said recess; a block carried by the tool holder and movable therein laterally of and against a side of the tool to fix it in assembly with the holder; means for moving the block against the tool; and a carrier for said means and in threaded connection with the holder, the tool receiving recess having an enlargement that receives said carrier.

2. In a tool structure, the combination with a tool holder formed with a tool receiving recess; of a tool inserted within said recess; a block carried by the tool holder and movable therein laterally of and against a side of the tool to fix it in assembly with the holder; an adjusting screw in wedging engagement with said block to move it laterally of and against the side of the tool; and a carrier for said adjusting screw and in threaded connection with the holder, the tool receiving recess having an enlargement that receives said carrier.

3. In a tool structure, the combination with a tool holder formed with a tool receiving recess; of a tool inserted within said recess; an adjusting screw carried by the holder and in threaded connection with the tool to give it micrometric adjustment in the holder; a block carried by the tool holder and movable therein laterally of and against a side of the tool to fix it in assembly with the holder; and means for moving the block against the tool.

4. In a tool structure, the combination with a tool holder formed with a tool receiving recess; of a tool inserted within said recess; an adjusting screw carried by the holder and in threaded connection with the tool to give it micrometric adjustment in the holder; a block carried by the tool holder and movable therein laterally of and against a side of the tool to fix it in assembly with the holder; and a second adjusting screw in wedging engagement with said block to move it laterally of and against the side of the tool.

5. In a tool structure, the combination with a tool holder formed with a tool receiving recess; of a tool inserted within said recess; an adjusting screw carried by the holder and in threaded connection with the tool to give it micrometric adjustment in the holder; a block carried by the tool holder and movable therein laterally of and against a side of the tool to fix it in assembly with the holder; means for moving the block against the tool; and a carrier for said means and in threaded connection with the holder, the tool receiving recess having an enlargement that receives said carrier.

6. In a tool structure, the combination with a tool holder formed with a tool receiving recess; of a tool inserted within said recess; an adjusting screw carried by the holder and in threaded connection with the tool to give it micrometric adjustment in the holder; a block carried by the tool holder and movable therein laterally of and against a side of the tool to fix it in assembly with the holder; a second adjusting screw in wedging engagement with said block to move it laterally of and against the side of the tool; and a carrier for said second adjusting screw and in threaded connection with the holder, the tool receiving recess having an enlargement that receives said carrier.

7. In a milling tool structure, the combination with a tool holder formed with a tool blade receiving recess; of a tool blade inserted within said recess; two adjusting screws carried by the holder and in threaded connection with the tool blade upon one side thereof to give the tool blade micrometric adjustment; a block between the aforesaid screws and engaging the opposite side of the tool blade to fix it in assembly with the holder; and means for moving the block laterally of and against the tool.

8. In a milling tool structure, the combination with a tool holder formed with a tool blade receiving recess; of a tool blade inserted within said recess; two adjusting screws carried by the holder and in threaded connection with the tool blade upon one side thereof to give the tool blade micrometric adjustment; a block between the aforesaid screws and engaging the opposite side of the tool blade to fix it in assembly with the holder; and an additional adjusting screws in wedging engagement with said block to move it laterally of and against the side of the tool.

9. In a milling tool structure, the combination with a tool holder formed with a tool blade receiving recess; of a tool blade inserted within said recess; two adjusting screws carried by the holder and in threaded connection with the tool blade upon one side thereof to give the tool blade micrometric adjustment; a block between the aforesaid screws and engaging the opposite side of the tool blade to fix it in assembly with the holder; means for moving the block laterally of and against the tool; and a carrier for said means and in threaded connection with the holder, the tool receiving recess having an enlargement that receives said carrier.

10. In a milling tool structure, the combination with a tool holder formed with a tool blade receiving recess; of a tool blade inserted within said recess; two adjusting screws carried by the holder and in threaded connection with the tool blade upon one side thereof to give the tool blade micrometric adjustment; a block between the aforesaid screws and engaging the opposite side of the tool blade to fix it in assembly with the holder; an additional adjusting screw in wedging engagement with said block to move it laterally of and against the side of the tool; and a carrier for said additional adjusting screw and in threaded connection with the holder, the tool receiving recess having an enlargement that receives said carrier.

In witness whereof, I hereunto subscribe my name this 16th day of March A. D., 1921.

GERARD A. DE VLIEG.